US010938272B2

(12) United States Patent
Taikou et al.

(10) Patent No.: US 10,938,272 B2
(45) Date of Patent: Mar. 2, 2021

(54) IN-WHEEL MOTOR DRIVE DEVICE

(71) Applicant: NTN CORPORATION, Osaka (JP)

(72) Inventors: Shinya Taikou, Shizuoka (JP); Shiro Tamura, Shizuoka (JP); Tomohisa Uozumi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 18 days.

(21) Appl. No.: 16/340,204

(22) PCT Filed: Nov. 2, 2016

(86) PCT No.: PCT/JP2016/082716
§ 371 (c)(1),
(2) Date: Apr. 8, 2019

(87) PCT Pub. No.: WO2018/070055
PCT Pub. Date: Apr. 19, 2018

(65) Prior Publication Data
US 2020/0044513 A1 Feb. 6, 2020

(30) Foreign Application Priority Data
Oct. 14, 2016 (JP) .............................. JP2016-202470

(51) Int. Cl.
*H02K 7/08* (2006.01)
*B60K 7/00* (2006.01)
(Continued)

(52) U.S. Cl.
CPC .......... *H02K 7/085* (2013.01); *B60K 7/0007* (2013.01); *F16H 1/08* (2013.01); *H02K 7/116* (2013.01)

(58) Field of Classification Search
CPC .......... H02K 7/08; H02K 7/116; H02K 7/085; B60K 7/00; B60K 7/0007;
(Continued)

(56) References Cited

U.S. PATENT DOCUMENTS

2011/0139522 A1* 6/2011 Takenaka ................. B60K 1/02
180/65.1
2012/0248850 A1* 10/2012 Hirano ................. B60K 7/0007
301/6.5
(Continued)

FOREIGN PATENT DOCUMENTS

JP 2010-48379 3/2010
JP 2012-214203 11/2012
(Continued)

OTHER PUBLICATIONS

Yamamoto, In-Wheel Motor Drive Unit, JPO machine translation of JP-2016181954-A, all pages (Year: 2016).*
(Continued)

*Primary Examiner* — Naishadh N Desai
(74) *Attorney, Agent, or Firm* — Wenderoth, Lind & Ponack, L.L.P.

(57) ABSTRACT

An in-wheel motor drive device includes an electric motor section, a speed reducer section having a speed-reduction structure using parallel shaft gears, a wheel bearing section, and a casing. The parallel shaft gears include at least one intermediate shaft each having an input-side and output-side intermediate gears, and an output shaft having a final output gear. The at least one intermediate shaft and the output shaft each have both end portions supported by rolling bearings to be rotatable. Among the rolling bearings, at least one rolling bearing arranged close to the input-side intermediate gear or a rolling bearing arranged close to the final output gear is arranged in a radially-inner-side recess portion of the gear, which is arranged close to the corresponding rolling bearing.

5 Claims, 5 Drawing Sheets

(51) Int. Cl.
*F16H 1/08* (2006.01)
*H02K 7/116* (2006.01)

(58) Field of Classification Search
CPC .... B60K 2007/0038; B60K 2007/0061; B60K 17/043; F16H 1/08; F16H 57/021; F16H 1/06; F16H 57/023; B60Y 2410/102; F16C 19/186; F16C 35/067
See application file for complete search history.

(56) References Cited

U.S. PATENT DOCUMENTS

| | | | | |
|---|---|---|---|---|
| 2013/0284528 | A1* | 10/2013 | Kawasaki | B60G 3/20 180/60 |
| 2014/0152075 | A1* | 6/2014 | Kanatani | F16H 55/17 301/6.5 |
| 2016/0229280 | A1 | 8/2016 | Kanatani | |
| 2016/0229281 | A1 | 8/2016 | Kanatani | |
| 2018/0079292 | A1 | 3/2018 | Kanatani | |
| 2018/0079293 | A1 | 3/2018 | Kanatani | |

FOREIGN PATENT DOCUMENTS

| | | |
|---|---|---|
| JP | 2013-209016 | 10/2013 |
| JP | 2016-161030 | 9/2016 |
| JP | 2016-181954 | 10/2016 |
| JP | 2016181954 A * | 10/2016 |
| WO | 2013/008694 | 1/2013 |
| WO | 2014/125856 | 8/2014 |

OTHER PUBLICATIONS

Extended European Search Report dated Mar. 5, 2020 in corresponding European Patent Application No. 16918558.4.
International Preliminary Report on Patentability dated Apr. 16, 2019 in International (PCT) Application No. PCT/JP2016/082716.
International Search Report dated Jan. 17, 2017 in International (PCT) Application No. PCT/JP2016/082716.

* cited by examiner

IN-WHEEL MOTOR DRIVE DEVICE

TECHNICAL FIELD

The present invention relates to an in-wheel motor drive device having a structure in which an output shaft of an electric motor section and a wheel bearing section are connected to each other via a speed reducer section.

BACKGROUND ART

An in-wheel motor drive device is accommodated inside a wheel, and thus becomes unsprung weight of a vehicle. Increase in unsprung weight deteriorates a ride comfort of a vehicle. Thus, reduction in weight and size of the in-wheel motor drive device is an important requirement. Output torque of an electric motor is proportional to size and weight of the electric motor. Thus, in order to generate torque required for drive of the vehicle solely by a motor, a motor having a large size is required. Therefore, there is adopted a measure for reducing the size through use of the electric motor in combination with the speed reducer.

However, when the electric motor, the speed reducer, and a wheel bearing are arrayed in series, the amount of projection of the in-wheel motor drive device from the wheel to the in-board side becomes larger. In a case in which a space for a wheel housing is the same as that of a vehicle with an internal combustion engine, when a vehicle is steered or vertically moved, interference occurs between a vehicle body and the in-wheel motor drive device. Therefore, it is required to reduce a movable range of a tire, or modify the vehicle body for the in-wheel motor drive device.

As a related art, there has been proposed an in-wheel motor drive device having the following configuration (Patent Document 1). Specifically, rotation of an electric motor is reduced in speed and transmitted from an output shaft of a speed reduction mechanism to a drive wheel. The speed reduction mechanism is formed of a parallel-shaft gear train, and the parallel-shaft gear train allows a rotation shaft of the electric motor to be arranged while being offset upward in a vertical direction of the vehicle. In this in-wheel motor drive device, the rotation shaft of the electric motor is offset in a radial direction with respect to an axis center of the wheel bearing. With this, for example, a connection point to a suspension mechanism and a brake caliper mounting portion can be provided in a space in the wheel which is not occupied by the electric motor. Moreover, the in-wheel motor drive device can be reduced in size as a whole, and hence interference with the vehicle body or suspension parts caused by a turning motion by a steering mechanism or a vertical motion by the suspension mechanism can easily be avoided.

PRIOR ART DOCUMENTS

Patent Documents

Patent Document: JP 2013-209016 A

SUMMARY OF THE INVENTION

Problems to be Solved by the Invention

In the in-wheel motor drive device, as described in Patent Document 1, the parallel shaft gear speed reducer is applied to achieve offset arrangement and downsizing of the electric motor. However, a gear shaft in a final stage of the speed reduction mechanism and the wheel bearing are coaxially arranged with a certain distance therebetween. It has been found that, even when a measure such as increasing the speed-reduction ratio is taken for downsizing of the speed reduction mechanism and the electric motor in such a manner that a part or an entirety of the motor can be accommodated in a cylindrical space on an inner periphery of a wheel, at least three elements including (1) a wheel bearing, (2) a support bearing for a gear shaft in a final stage of the speed reducer, and (3) a gear in the final stage of the speed reducer are arrayed coaxially with an axle, with the result that the downsizing, in particular, reduction in axial dimension is significantly hindered.

As a result, the following problems have arisen. The limitation on the shape of the suspension parts causes adverse effects such as increase in weight or reduction in strength of the suspension parts and reduction in minimum ground height. Moreover, design change on the vehicle body side is required in order to avoid the interference, with the result that the motion performance of the vehicle is degraded, and cost merit of standardization of the vehicle body is lost. The present invention has focused on those problems.

In view of the above-mentioned problems, the present invention has an object to achieve the downsizing, in particular, the downsizing in the axial direction of the in-wheel motor drive device including the parallel shaft gear speed reducer, thereby improving mountability to the vehicle.

Solution to the Problems

According to one embodiment of the present invention, which has been devised to achieve the above-mentioned object, there is provided an in-wheel motor drive device, comprising: an electric motor section a speed reducer section having a speed-reduction structure using parallel shaft gears; a wheel bearing section; and a casing, wherein the parallel shaft gears comprises: one or a plurality of intermediate shafts each comprising an input-side intermediate gear and an output-side intermediate gear; and an output shaft comprising a final output gear, wherein the one or the plurality of intermediate shafts and the output shaft each comprise both end portions supported by rolling bearings so as to be rotatable, wherein, among the rolling bearings, at least one of a rolling bearing arranged close to the input-side intermediate gear or a rolling bearing arranged close to the final output gear is arranged in a radially-inner-side recess portion of the gear, which is arranged close to the corresponding rolling bearing.

With the configuration described above, the in-wheel motor drive device including the parallel shaft gear speed reducer can be achieved the downsizing, in particular, the downsizing in the axial direction, thereby being capable of improving mountability to the vehicle.

Specifically, it is preferred that the at least one of the rolling bearings comprise a rolling bearing, which is arranged close to the input-side intermediate gear, and is arranged in a radially-inner-side recess portion of the input-side intermediate gear. With this, the support structure for the intermediate shaft including the input-side intermediate gear can be shortened in the axial direction.

It is preferred that the at least one of the rolling bearings comprise a rolling bearing, which is arranged close to the final output gear, and is arranged in a radially-inner-side recess portion of the final output gear of the output shaft, which is connected to the wheel bearing section. With this, the support structure for the output shaft including the final output gear can be shortened in the axial direction.

It is preferred that a width surface of the radially-inner-side recess portion of the final output gear have a recessed portion formed on a radially inner side, the recessed portion having accommodated therein a caulked portion of a hub ring, which is configured to fix an inner ring of the wheel bearing section. With this, size reduction in axial dimension can be promoted.

The recessed portion and the radially-inner-side recess portion of the final output gear are formed so as to be superimposed with each other in the radial direction. With this, the axial dimension can be efficiently reduced.

The thinned portion and the reinforcement rib are formed in the radially-inner-side recess portion. With this, the input-side intermediate gear and the final output gear can be reduced in weight, and the strength and the stiffness can also be secured.

It is preferred that the intermediate shaft and the output shaft have an inter-axis distance which is set smaller than a dimension corresponding to a sum of pitch circle radii of the input-side intermediate gear and the final output gear. With this, the downsizing of an outer peripheral contour of the in-wheel motor drive device can be achieved, and hence the in-wheel motor drive device can be mounted inside a wheel of an existing vehicle with an internal combustion engine.

The speed-reduction structure described above comprises a two-stage parallel shaft gear. With this, the number of components can be reduced, thereby being capable of achieving both high speed-reduction ratio and the downsizing.

Effects of the Invention

According to the present invention, there can be achieved the downsizing of the in-wheel motor comprising the parallel shaft gear speed reducer, in particular, the downsizing in the axial direction, thereby improving mountability to the vehicle.

DESCRIPTION OF EMBODIMENTS

Figure 4:
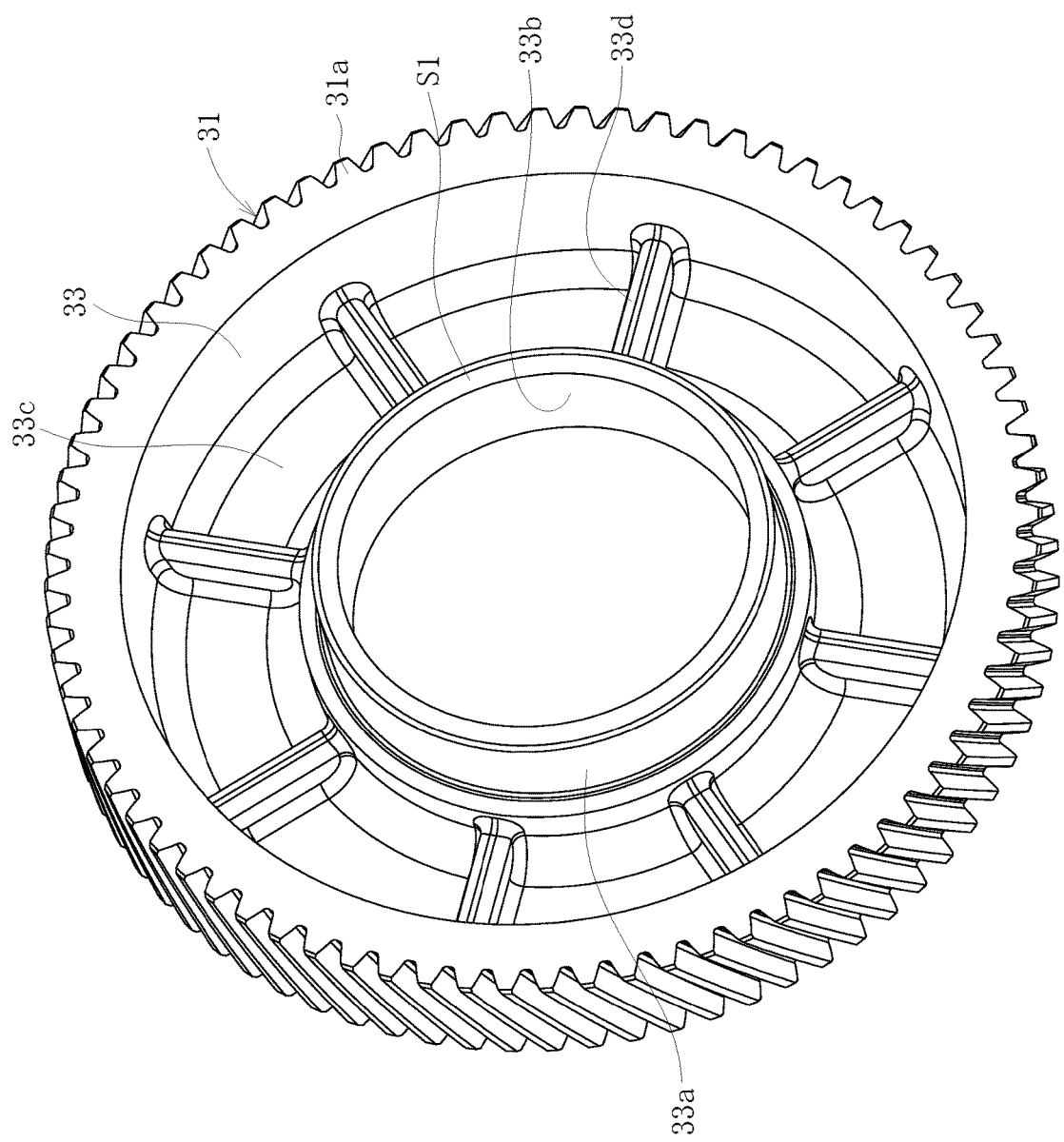
FIG. 4 is a perspective view for illustrating an input-side intermediate gear of FIG. 1.
Figure 5:
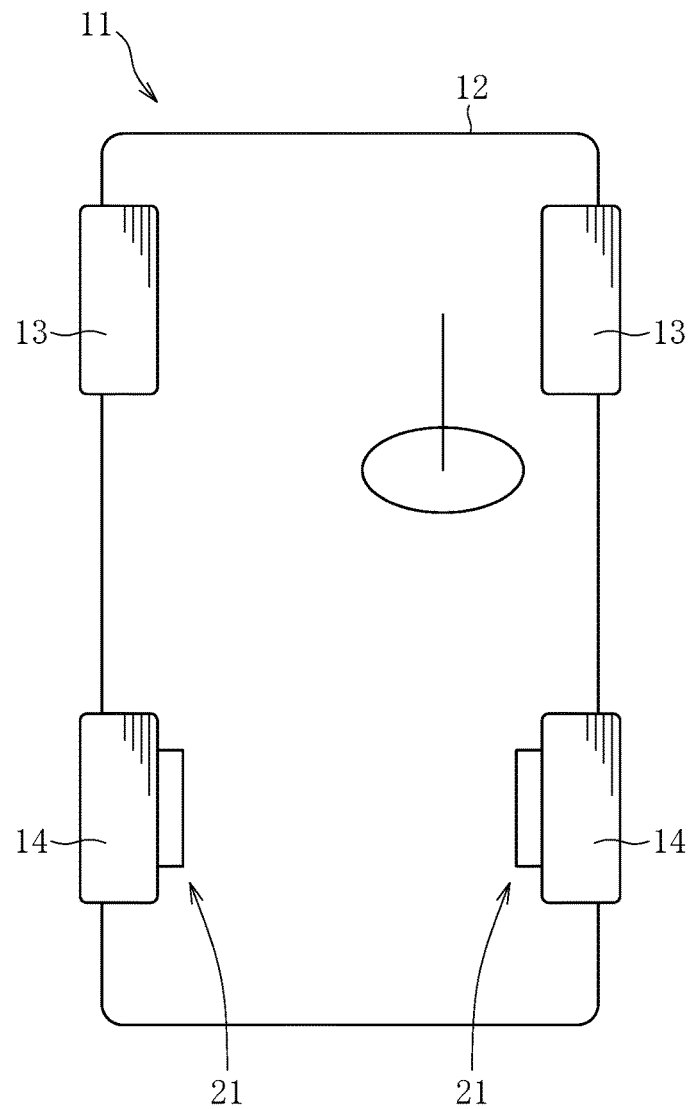
FIG. 5 is a plan view for illustrating a schematic configuration of an electric vehicle on which in-wheel motor drive devices are mounted.
Figure 6:
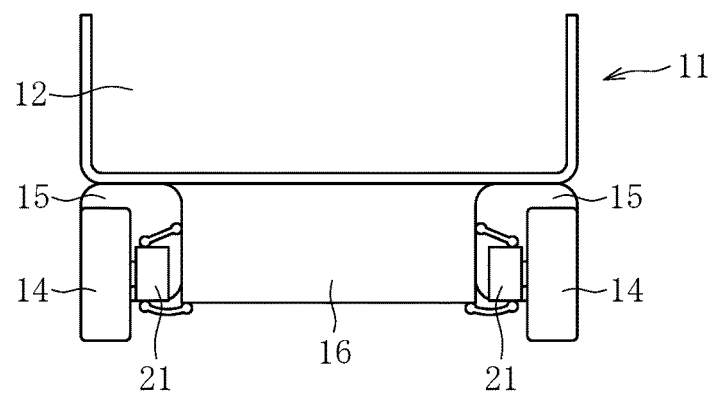
FIG. 6 is a rear sectional view for illustrating the electric vehicle of FIG. 6.

An in-wheel motor drive device according to one embodiment of the present invention is described with reference to FIG. 1 to FIG. 6. First, with reference to FIG. 5 and FIG. 6, description is made of an electric vehicle on which in-wheel motor drive devices according to this embodiment are mounted. FIG. 5 is a schematic plan view for illustrating an electric vehicle 11 on which in-wheel motor drive devices 21 are mounted, and FIG. 6 is a schematic sectional view for illustrating the electric vehicle 11 as viewed from a rear side.

As illustrated in FIG. 5, the electric vehicle 11 comprises a chassis 12, front wheels 13 serving as steered wheels, rear wheels 14 serving as driving wheels, and the in-wheel motor drive devices 21 configured to transmit driving force to the rear wheels 14. As illustrated in FIG. 6, each rear wheel 14 is accommodated inside a wheel housing 15 of the chassis 12 and fixed below the chassis 12 via a suspension device (suspension) 16.

In the suspension device 16, a horizontally extending suspension arm is configured to support the rear wheels 14, and a strut comprising a coil spring and a shock absorber is configured to absorb vibrations that each rear wheel 14 receives from the ground to suppress the vibrations of the chassis 12. In addition, a stabilizer configured to suppress tilting of a vehicle body during turning and other operations is provided at connecting portions of the right and left suspension arms. In order to improve the property of following irregularities of a road surface to transmit the driving force of the rear wheels 14 to the road surface efficiently, the suspension device 16 is an independent suspension type capable of independently moving the right and left wheels up and down.

The electric vehicle 11 does not need to comprise a motor, a drive shaft, a differential gear mechanism, and other components on the chassis 12 because the in-wheel motor drive devices 21 configured to drive the right and left rear wheels 14, respectively, are arranged inside the wheel housings 15. Accordingly, the electric vehicle 11 has the advantages in that a large passenger compartment space can be provided and that rotation of the right and left rear wheels 14 can be controlled, respectively.

Prior to the description of a characteristic configuration of this embodiment, an overall configuration of the in-wheel motor drive device 21 is described with reference to FIG. 1 to FIG. 3. In the following description, under a state in which the in-wheel motor drive device 21 is mounted to the vehicle, a side closer to an outer side of the vehicle is referred to as "out-board side", and a side closer to a center is referred to as "in-board side".

Figure 1:
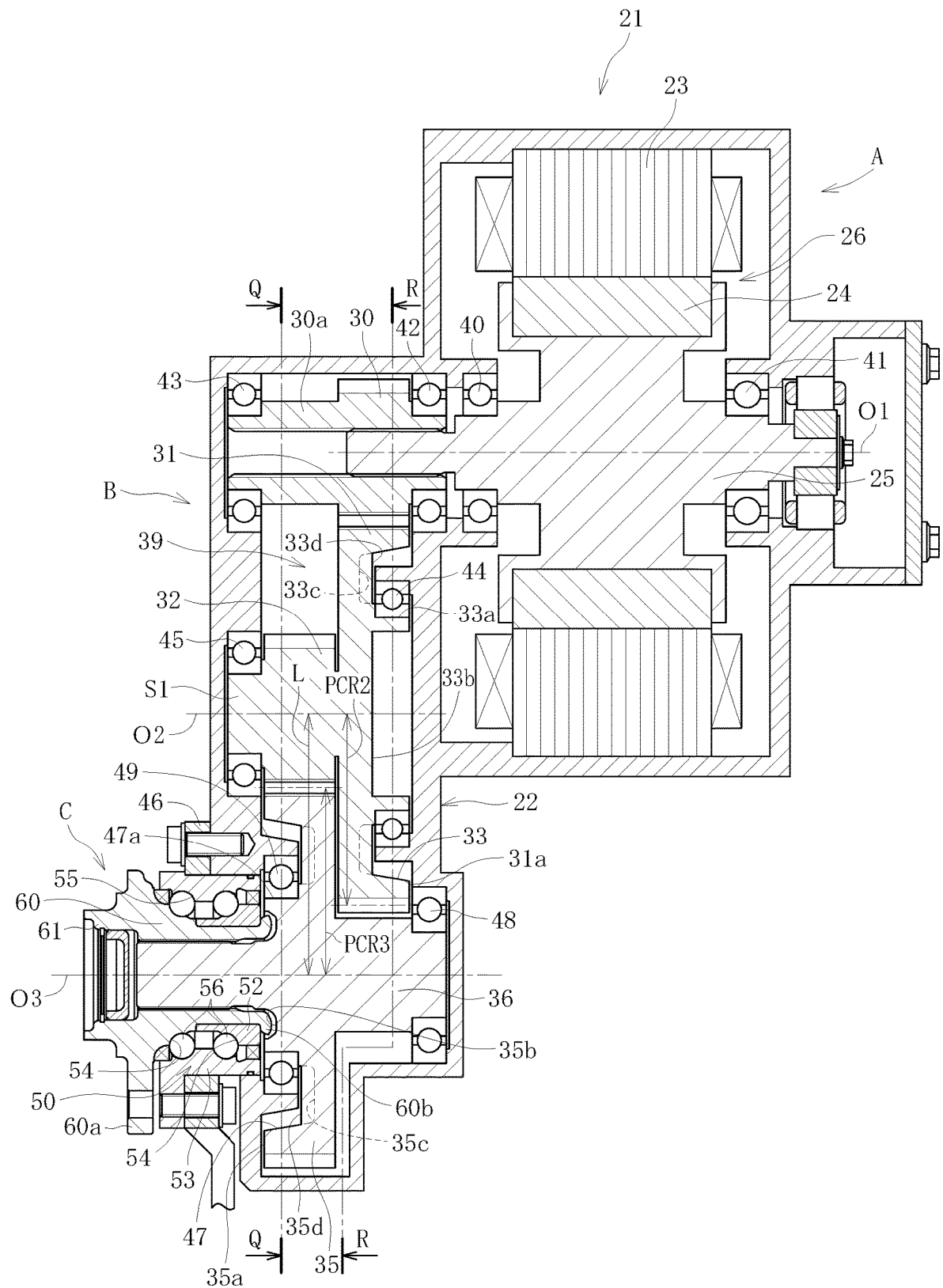
FIG. 1 is a vertical sectional view for illustrating an in-wheel motor drive device according to one embodiment of the present invention, which is taken along the line P-P of FIG. 2 and viewed in the direction indicated by the arrows.
Figure 2:
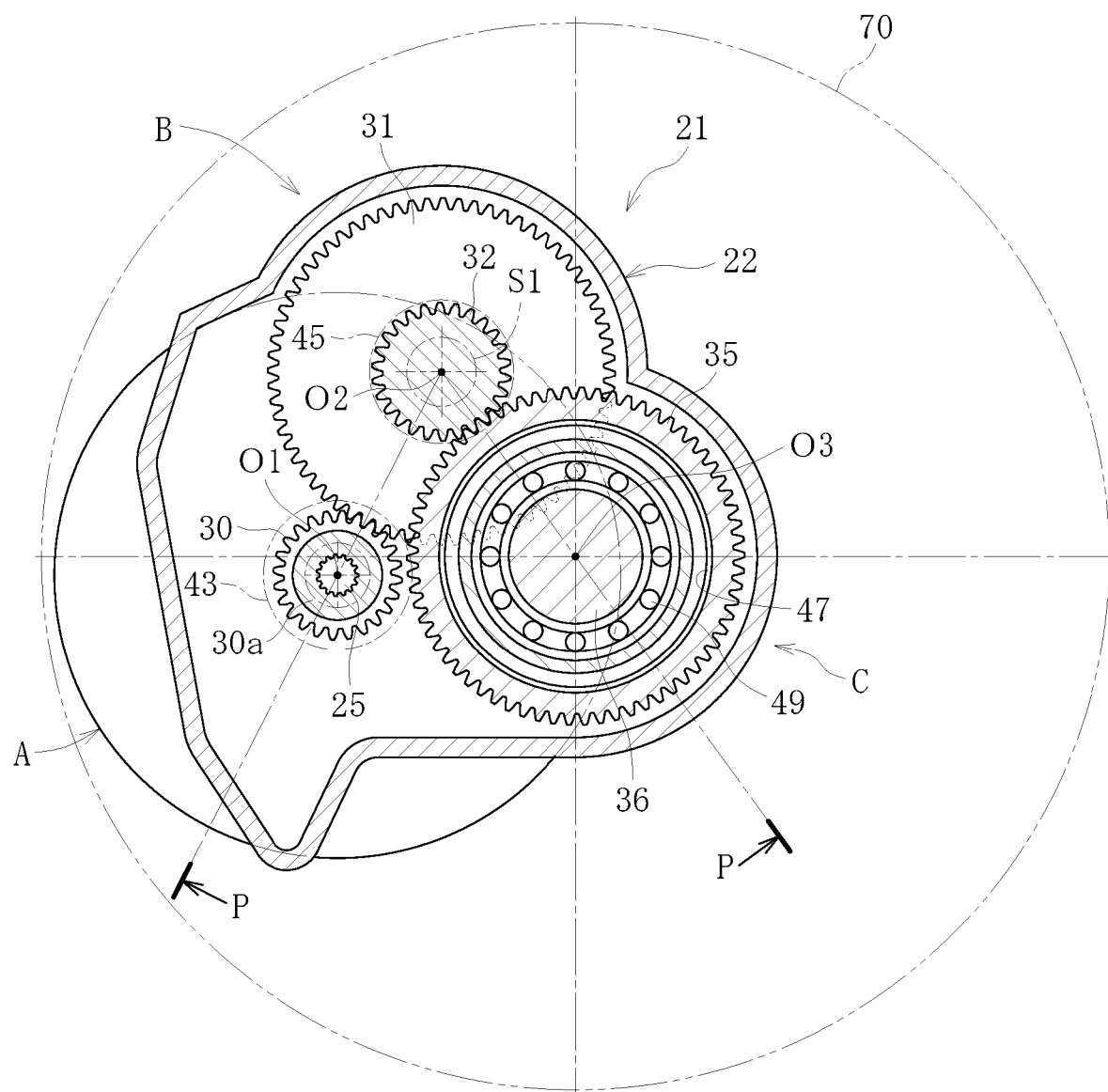
FIG. 2 is a transverse sectional view for illustrating the in-wheel motor drive device, which is taken along the line Q-Q of FIG. 1 and viewed in the direction indicated by the arrows.

FIG. 1 is a vertical sectional view for illustrating an in-wheel motor drive device according to one embodiment of the present invention, which is taken along the line P-P of FIG. 2 and viewed in the direction indicated by the arrows. FIG. 2 is a transverse sectional view for illustrating the in-wheel motor drive device, which is taken along the line Q-Q of FIG. 1 and viewed in the direction indicated by the arrows. FIG. 3 is a transverse sectional view for illustrating the in-wheel motor drive device, which is taken along the line R-R of FIG. 1 and viewed in the direction indicated by the arrows.

As illustrated in FIG. 1, the in-wheel motor drive device 21 comprises an electric motor section A configured to generate driving force, the speed reducer section B configured to reduce a speed of rotation of the electric motor section A to output the rotation, and a wheel bearing section C configured to transmit the output from the speed reducer section B to the rear wheels serving as driving wheels. The electric motor section A, the speed reducer section B, and the wheel bearing section C are accommodated in or mounted to a casing 22. The casing 22 may have a unified structure as illustrated in FIG. 1, or may have a dividable structure.

The electric motor section A is a radial gap type electric motor 26 comprising a stator 23 fixed to the casing 22, a rotor 24 arranged on a radially inner side of the stator 23 at an opposed position with a gap, and a rotation shaft 25 of the motor, which is arranged on a radially inner side of the rotor 24 so as to rotate integrally with the rotor 24. The motor rotation shaft 25 is rotatable at high speed of ten and several thousand rotations per minute. The stator 23 is formed by winding a coil around a magnetic core, and the rotor 24 comprises, for example, a permanent magnet.

The rotation shaft 25 of the motor is rotatably supported by a rolling bearing 40 at one end portion in its axial direction (left side of FIG. 1) and by a rolling bearing 41 at another end portion in the axial direction (right side of FIG. 1) with respect to the casing 22, respectively.

The speed reducer section B comprises an input gear 30, an input-side intermediate gear 31 and an output-side intermediate gear 32, which are intermediate gears, and a final output gear 35. The input gear 30 integrally comprises an input shaft 30a. The input shaft 30a is coaxially connected to the motor rotation shaft 25 by spline fitting (including serration fitting, which similarly applies in the following description). An intermediate shaft S1 comprising the input-side intermediate gear 31 and the output-side intermediate gear 32 is formed integrally with the intermediate gears 31 and 32. An output shaft 36 comprising the final output gear 35 is formed integrally with the final output gear 35.

The input shaft 30a, the intermediate shaft S1, and the output shaft 36 are arranged in parallel with each other. The input shaft 30a is supported at its both end portions by rolling bearings 42 and 43 so as to be freely rotatable relative to the casing 22. The intermediate shaft S1 is supported at its both end portions by rolling bearings 44 and 45 so as to be freely rotatable relative to the casing 22. The output shaft 36 is supported at its both ends by rolling bearings 48 and 49 so as to be freely rotatable relative to the casing 22. The both end portions of each of the intermediate shaft S1 and the output shaft 36 are not limited to respective shaft end portions. For example, as illustrated in FIG. 1, the both end portions encompass halfway positions on the outer side (out-board side) of the final output gear 35 of the output shaft 36. Briefly, the intermediate shaft S1 is supported at its both ends by the rolling bearings 44 and 45, and the output shaft 36 is supported at its both ends by the rolling bearings 48 and 49. In Description and Claims, the term "both end portions" of each of the intermediate shaft and the output shaft is used with the meaning described above.

Figure 3:
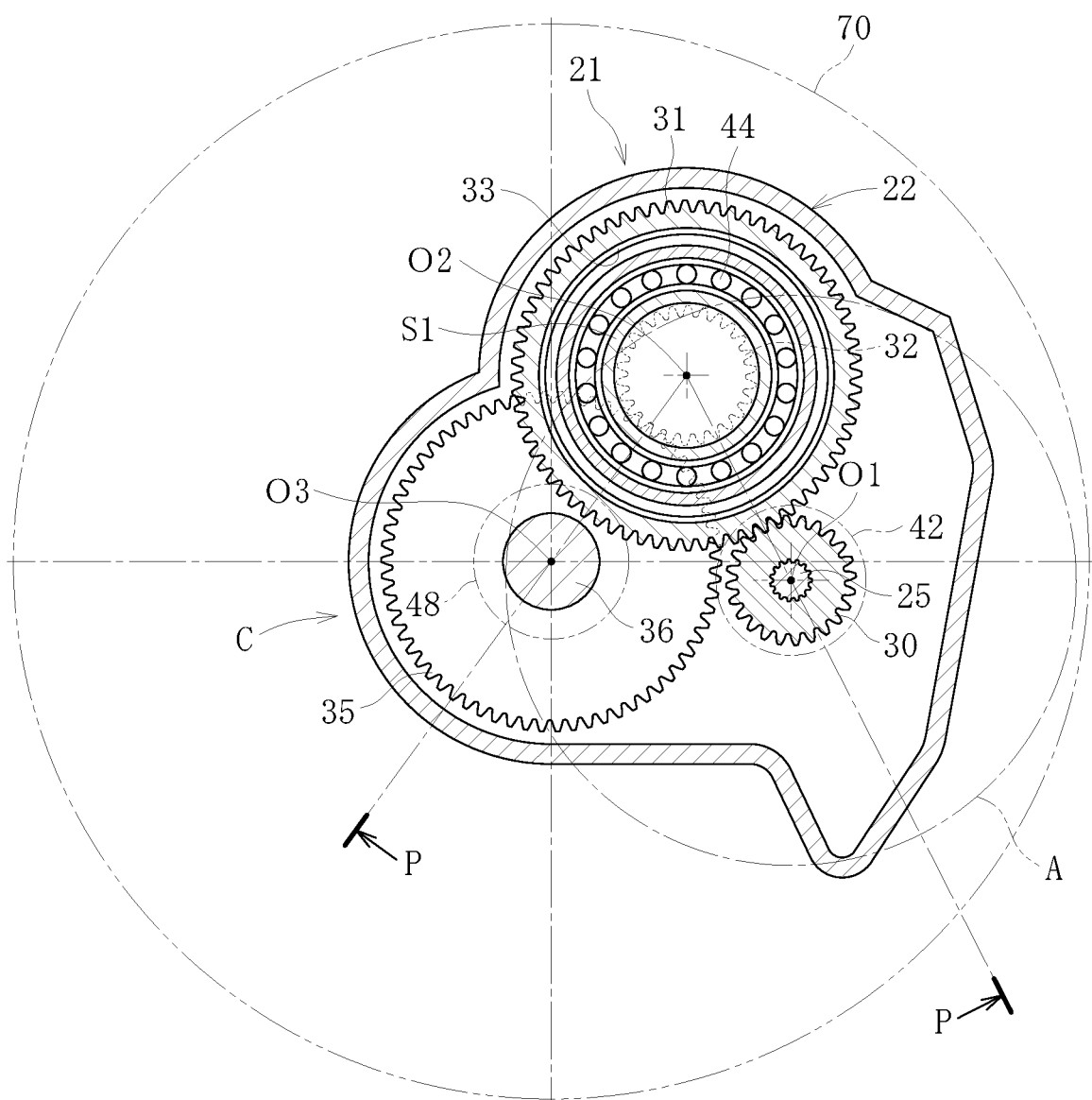
FIG. 3 is a transverse sectional view for illustrating the in-wheel motor drive device, which is taken along the line R-R of FIG. 1 and viewed in the direction indicated by the arrows.

As illustrated in FIG. 2 and FIG. 3, a center O2 of the intermediate shaft S1 is arranged between a center O1 of the input shaft 30a (which is also a center of the motor rotation shaft 25) of the speed reducer section B and a center O3 of the wheel bearing section C, and lines connecting the centers O1, O2, and O3 form a triangular shape. Such arrangement is adopted to achieve the downsizing of the outer peripheral contour of the in-wheel motor drive device 21. With this, the in-wheel motor drive device 21 can be mounted in the wheel 70 of an existing vehicle with an internal combustion engine.

FIG. 2 is a transverse sectional view as viewed in the direction indicated by the arrows of the line Q-Q of FIG. 1, that is, as viewed from the out-board side. The rolling bearing 49 configured to support the output shaft 36 on the out-board side is arranged in a radially-inner-side recess portion 47 of the final output gear 35. Moreover, FIG. 3 is a transverse sectional view as viewed in the direction indicated by the arrows of the line R-R of FIG. 1, that is, as viewed from the in-board side. The rolling bearing 44 configured to support the intermediate shaft S1 on the in-board side is arranged in a radially-inner-side recess portion 33 of the input-side intermediate gear 31. Details are described later.

As illustrated in FIG. 1, in the speed reducer section B, the input gear 30 and the input-side intermediate gear 31 mesh with each other, and the output-side intermediate gear 32 and the final output gear 35 mesh with each other. The number of teeth of the input-side intermediate gear 31 is larger than the number of teeth of each of the input gear 30 and the output-side intermediate gear 32, and the number of teeth of the final output gear 35 is larger than the number of teeth of the output-side intermediate gear 32. With the configuration described above, the parallel shaft gear speed reducer 39 is configured so as to reduce the speed of the rotary motion of the motor rotation shaft 25 in two stages. The speed reduction mechanism comprising parallel shaft gears in two stages has a relatively smaller number of components. Further, in association with an arrangement structure of the parallel shaft gears and the support bearings described later, both high speed-reduction ratio and the downsizing can be achieved.

In this embodiment, helical gears are used as the input gear 30, the input-side intermediate gear 31, the output-side intermediate gear 32, and the final output gear 35 forming the speed reducer 39. With the helical gears, the number of teeth which are simultaneously in mesh becomes larger, and teeth contact is dispersed. Therefore, the helical gears are effective in quietness and less torque fluctuation. In consideration of a meshing ratio and a limit rotation number of the gears, it is preferred that the modules of the gears be set to from 1 to 3.

The wheel bearing section C is constructed by a wheel bearing 50 of an inner-ring rotation type. The wheel bearing 50 is a double-row angular contact ball bearing mainly comprising an inner member 61, an outer ring 53, balls 56, and a retainer (not shown). The inner member 61 comprises a hub ring 60 and an inner ring 52. A flange portion 60a for mounting a wheel is formed on an outer periphery of the hub ring 60 on the out-board side, and the inner ring 52 is fitted and caulked so to be fixed on a small-diameter step portion on the in-board side. After assembly of the wheel bearing 50, a caulked portion 60b fixes the inner ring 52 and applies a pre-load to the wheel bearing 50. An inner raceway surface 54 on the out-board side is formed on an outer periphery of the hub ring 60, and an inner raceway surface 54 on the in-board side is formed on an outer periphery of the inner ring 52. Although illustration is omitted, a brake disc and a wheel are mounted to the flange portion 60a for mounting a wheel.

On an inner periphery of the outer ring 53, there are formed double-row outer raceway surfaces 55 so as to correspond to the inner raceway surface 54 of the hub ring 60 and the inner raceway surface 54 of the inner ring 52. A flange portion is formed on an outer periphery of the outer ring 53, and is fastened and fixed by bolts to the casing 22 through intermediation of an attachment 46. The output shaft 36 is fitted to the hub ring 60 by spline fitting, and is connected in a torque-transmittable manner.

In the in-wheel motor drive device 21, for cooling of the electric motor 26 and for lubrication and cooling of the speed reducer 39, lubricating oil is fed to relevant portions by a rotary pump (not shown). The inside of the wheel bearing 50 is lubricated by grease.

The in-wheel motor drive device 21 is accommodated inside a wheel housing 15 (see FIG. 6), and thus becomes unsprung load. Therefore, the downsizing and weight reduction is essentially required. Through combination of the parallel shaft gear speed reducer 39 having the configuration described above with the electric motor 26, the small electric motor 26 with low torque and high-speed rotation can be used. For example, in a case in which the parallel shaft gear speed reducer 39 having a speed-reduction ratio of 11 is used, through use of the electric motor 26 with high-speed rotation of about ten and several thousand rotations per minute, the downsizing of the electric motor 26 can be achieved. With this, the compact in-wheel motor drive device 21 can be achieved. As a result, the unsprung weight is suppressed, thereby being capable of obtaining the electric vehicle 11 which is excellent in traveling stability and NVH characteristics.

The entire configuration of the in-wheel motor drive device 21 according to this embodiment is as described above. Characteristic configurations are described below.

In order to achieve the downsizing and weight reduction of the in-wheel motor drive device 21, it is effective to increase the speed-reduction ratio of each stage of the parallel shaft gear speed reducer 39. When the speed-reduction ratio of each stage of the parallel shaft gear speed reducer 39 is increased, it is inevitably required to increase diameters of the input-side intermediate gear 31 and the final output gear 35. Through effective use of this relationship, the in-wheel motor drive device 21 according to this embodiment has the characteristic configuration in that at least one of the rolling bearing 44 arranged close to the input-side intermediate gear 31 or the rolling bearing 49 arranged close to the final output gear 35 is arranged at the radially-inner-side recess portion of the gear arranged close thereto, to thereby reduce the axial dimension of the device as much as possible.

As illustrated in FIG. 1, the intermediate shaft S1 comprising the input-side intermediate gear 31 and the output-side intermediate gear 32 is supported at its both end portions by the rolling bearings 44 and 45 so as to be freely rotatable relative to the housing 22. The input-side intermediate gear 31 has a large diameter, and the radially-inner-side recess portion 33 is formed in a width surface 31a on the in-board side. The radially-inner-side recess portion 33 has a mounting surface 33a to which the inner ring of the rolling bearings 44 is fitted. A counterboring portion 33b is formed more on a radially inner side of the radially-inner-side recess portion 33, thereby achieving reduction in weight of the input-side intermediate gear 31.

Details of the radially-inner-side recess portion 33 of the input-side intermediate gear 31 are described with reference to FIG. 4. FIG. 4 is a perspective view for illustrating the input-side intermediate gear 31 (including the intermediate shaft S1) as viewed from the in-board side. The radially-inner-side recess portion 33 is formed in the width surface 31a of the input-side intermediate gear 31 on the in-board side, and the mounting surface 33a for the rolling bearing 44 (see FIG. 1) is formed on the outer peripheral surface of the radially-inner-side recess portion 33. The counterboring portion 33b is formed on the radially inner side of the mounting surface 33a. A thinned portion 33c and reinforcement ribs 33d are formed at a bottom portion of the radially-inner-side recess portion 33, thereby achieving reduction in weight of the input-side intermediate gear 31 and securing strength and stiffness.

The input-side intermediate gear 31 has the structure described above. Therefore, the rolling bearing 44 configured to support the end portion of the intermediate shaft S1 on the in-board side, in other words, the rolling bearing 44 arranged close to the input-side intermediate gear 31 can be incorporated into the mounting surface 33a of the radially-inner-side recess portion 33 of the input-side intermediate gear 31, thereby being capable of reducing the axial dimension at this portion as much as possible.

Next, the structure of the final output gear 35 is described with reference to FIG. 1. The output shaft 36 comprising the final output gear 35 is supported at its both end portions by the rolling bearings 48 and 49 so as to be freely rotatable with respect to the housing 22. The final output gear 35 also has a large diameter, and the radially-inner-side recess portion 47 is formed on the width surface 35a on the out-board side. The radially-inner-side recess portion 47 has a mounting surface 47a to which the inner ring of the rolling bearing 49 is fitted. The radially-inner-side recess portion 47 of the final output gear 35 also has the thinned portion 35c and the reinforcement ribs 35d similarly to the input-side intermediate gear 31 described above.

A recessed portion 35b is formed in a width surface of the mounting surface 47a of the radially-inner-side recess portion 47 more on the radially inner side. The caulked portion 60b of the hub ring 60 of the wheel bearing 50 is accommodated in the recessed portion 35b. With employment of the recessed portion 35b, the reduction in axial dimension can be promoted. Moreover, the recessed portion 35b and the mounting surface 47a of the radially-inner-side recess portion 47 are formed so as to be superimposed with each other in the radial direction, thereby being capable of efficiently reducing the axial dimension at this portion.

The final output gear 35 has the structure described above. Therefore, the rolling bearing 49 configured to support the end portion of the output shaft 36 on the out-board side, in other words, the rolling bearing 49 arranged close to the final output gear 35 can be incorporated into the mounting surface 47a of the radially-inner-side recess portion 47 of the final output gear 35. In association with this configuration, the caulked portion 60b of the hub ring 60 of the wheel bearing 50 is accommodated in the recessed portion 35b, thereby being capable of further reducing the axial dimension at this portion.

In this embodiment, illustration is given of the case in which the radially-inner-side recess portions 33 and 47 are formed in both of the input-side intermediate gear 31 and the final output gear 35. However, the present invention is not limited to this configuration. The radially-inner-side recess portion may be formed only in any one of the input-side intermediate gear 31 and the final output gear 35, with a rolling bearing incorporated into the mounting surface of the radially-inner-side recess portion. Moreover, illustration is given of the case in which the thinned portion and the reinforcement ribs are formed on both of the radially-inner-side recess portions 33 and 43. However, the present invention is not limited to this configuration. The thinned portion and the reinforcement ribs may be formed only on any one of the radially-inner-side recess portions. Further, the thinned portion and the reinforcement ribs may be omitted.

The in-wheel motor drive device 21 according to this embodiment is downsized also in the radial direction. As described above with reference to FIG. 2 and FIG. 3, the center O2 of the intermediate shaft S1 is arranged between the center O1 (which is also a center of the motor rotation shaft 25) and the center O3 of the wheel bearing section C, and lines connecting the centers O1, O2, and O3 form a triangular shape, thereby achieving the downsizing of the outer peripheral contour of the in-wheel motor drive device 21.

For the triangular arrangement of the centers O1, O2, and O3, the radial dimension of the outer peripheral contour of the in-wheel motor drive device 21 is maximally reduced.

Specifically, as illustrated in FIG. 1, the inter-axis distance L between the intermediate shaft S1 and the output shaft 36 is set smaller than a dimension corresponding to a sum of a pitch circle diameter PCR2 of the input-side intermediate gear 31 and a pitch circle diameter PCR3 of the final output gear 35. With this, in association with the triangular arrangement of the centers O1, O2, and O3, the outer peripheral contour of the in-wheel motor drive device 21 is extremely downsized, and hence the in-wheel motor drive device 21 can be mounted inside the wheel 70 of an existing vehicle with an internal combustion engine.

As described above, the in-wheel motor drive device 21 according to this embodiment comprising the parallel shaft gear speed reducer is downsized as a whole, especially the downsizing in the axial direction, thereby improving mountability to the vehicle.

As the speed reducer section B of the in-wheel motor drive device 21 according to the embodiment described above, illustration is given of the case in which the parallel shaft gear speed reducer 39 with two-stage speed reduction. However, the present invention is not limited to this configuration. The parallel shaft gear speed reducer 39 may be of one-stage speed reduction or speed reduction of three stages or more.

The present invention is not limited to the above-mentioned embodiment. As a matter of course, the present invention may be carried out in various modes without departing from the gist of the present invention. The scope of the present invention is defined in the scope of claims, and encompasses equivalents described in claims and all changes within the scope of claims.

DESCRIPTION OF REFERENCE SIGNS 21 in-wheel motor drive devices
22 casing
25 motor rotation shaft
26 electric motor
30 input gear
30a input shaft
31 input-side intermediate gear
32 output-side intermediate gear
33 radially-inner-side recess portion
33a mounting surface
33c thinned portion
33d reinforcement rib
35 final output gear
35b recessed portion
35c thinned portion
35d reinforcement rib
36 output shaft
39 parallel shaft gear speed reducer
44 rolling bearing
47 radially-inner-side recess portion
49 rolling bearing
50 wheel bearing
52 inner ring
53 outer ring
60 caulked portion
60b caulked portion
A electric motor section
B speed reducer section
C wheel bearing section
L inter axis distance
PCR2 pitch circle diameter
PCR3 pitch circle diameter
S1 intermediate shaft

The invention claimed is:

1. An in wheel motor drive device comprising:
an electric motor section;
a speed reducer section having a speed-reduction structure using parallel shaft gears;
a wheel bearing section; and
a casing,
wherein the parallel shaft gears comprise:
one or a plurality of intermediate shafts each comprising an input-side intermediate gear and an output-side intermediate gear; and
an output shaft comprising a final output gear,
wherein the one or the plurality of intermediate shafts and the output shaft each comprise both end portions supported by rolling bearings so as to be rotatable,
wherein, among the rolling bearings, a rolling bearing arranged close to the final output gear is arranged in a radially-inner-side recess portion of the final output gear of the output shaft, which is connected to the wheel bearing section, and
wherein a width surface of the radially-inner-side recess portion of the final output gear has a recessed portion formed on a radially inner side, the recessed portion having accommodated therein a caulked portion of a hub ring, which is configured to fix an inner ring of the wheel bearing section.

2. The in-wheel motor drive device according to claim 1, wherein the recessed portion of the final output gear and the radially-inner-side recess portion are formed so as to be superimposed with each other in a radial direction.

3. The in-wheel motor drive device according to claim 1, wherein the radially-inner-side recess portion has a thinned portion and a reinforcement rib.

4. The in-wheel motor drive device according to claim 1, wherein the intermediate shaft and the output shaft have an inter-axis distance which is set smaller than a dimension corresponding to a sum of pitch circle radii of the input-side intermediate gear and the final output gear.

5. The in-wheel motor drive device according to claim 1, wherein the speed-reduction structure comprises two-stage parallel shaft gears.

* * * * *